(12) United States Patent
Van Hattem

(10) Patent No.: US 8,640,603 B2
(45) Date of Patent: Feb. 4, 2014

(54) DEVICE FOR MAKING TEA

(76) Inventor: Johannes Cornelis Van Hattem, Amerongen (NL)

( * ) Notice: Subject to any disclaimer, the term of this patent is extended or adjusted under 35 U.S.C. 154(b) by 1353 days.

(21) Appl. No.: 12/380,540

(22) Filed: Feb. 27, 2009

(65) Prior Publication Data

US 2009/0252846 A1 Oct. 8, 2009

(51) Int. Cl.
*A47J 31/057* (2006.01)

(52) U.S. Cl.
USPC .......................................... 99/289 R; 99/300

(58) Field of Classification Search
USPC ................ 99/289 R, 299, 304, 300; 426/435
See application file for complete search history.

(56) References Cited

U.S. PATENT DOCUMENTS

| | | | | | |
|---|---|---|---|---|---|
| 1,352,435 | A | * | 9/1920 | Dennert | 99/281 |
| 2,154,845 | A | * | 4/1939 | Hegwein | 99/302 R |
| 2,879,811 | A | * | 3/1959 | Parraga | 141/82 |
| 4,784,051 | A | * | 11/1988 | Hauslein | 99/307 |
| 5,197,373 | A | * | 3/1993 | De Jong | 99/283 |
| RE34,482 | E | * | 12/1993 | Pastrick | 99/295 |
| 5,408,918 | A | * | 4/1995 | King et al. | 99/289 R |
| 5,635,233 | A | * | 6/1997 | Levinson | 426/433 |
| 5,800,852 | A | * | 9/1998 | Levinson | 426/433 |
| 5,823,096 | A | * | 10/1998 | Shih | 99/302 P |
| 6,324,964 | B1 | * | 12/2001 | Niederberger et al. | 99/287 |
| 2003/0192436 | A1 | * | 10/2003 | Schreiner et al. | 99/410 |
| 2005/0139083 | A1 | * | 6/2005 | Brouwer et al. | 99/279 |

FOREIGN PATENT DOCUMENTS

| | | | |
|---|---|---|---|
| DE | 2829775 | | 7/1978 |
| DE | 2829775 | A * | 1/1980 |
| WO | WO 2004093619 | A1 * | 11/2004 |

* cited by examiner

*Primary Examiner* — Henry Yuen
*Assistant Examiner* — Hemant Mathew
(74) *Attorney, Agent, or Firm* — Paul M Denk

(57) ABSTRACT

Method and device for automatic preparing of tea. A container is provided with a strainer bottom and a closable discharge line downstream of said bottom. In a first step, water is fed in until the strainer bottom is substantially covered with water. Tea leaves, which can absorb the water, are then added. After that, further water is added, and tea can be made. The discharge line is then opened and the ready beverage is discharged, possibly with further water being fed in. The remaining tea leaves are left behind on the surface of the strainer. The container is then split into a container sleeve and strainer bottom, and a brush is placed between them for the purpose of removing the leaves.

6 Claims, 4 Drawing Sheets

DEVICE FOR MAKING TEA

Such a method is disclosed in DE2829775.

In the text below, automatic preparing of tea should be understood to include automatic preparing of any beverage wherein a fluid such as water, or water with any addition, is exposed to a powdered or other material and wherein direct mixing does not occur, and where a part of the powdered material, such as tea leaves, is left behind. Likewise, tea leaves should be understood to include any form of tea, such as tea dust and the like.

While automatic coffee-making machines are generally known in the prior art, only a limited number of methods and devices for automatic making of tea are known in the prior art.

In the most common method and device a bowl with a strainer bottom is provided. Leaves are placed on it mechanically, and water is then passed through, a process which can be performed under raised pressure or otherwise. Where water is passed through under raised pressure, a beverage resembling tea is produced, but it is not clear and it has bubbles.

In all cases the tea is removed from the strainer after a measured quantity of tea has been prepared. In a non-pressurized system it is known to make the container with strainer bottom rotate at high speed a quarter turn or further, so that the inertia causes the tea to be knocked off the strainer bottom.

In practice, it has been found that this system is not satisfactory in operation. Depending on the method of use, it has been found that the tea is not completely removed from the bottom. Furthermore, it has been found that in this way it is not possible to imitate the manual method of prepared tea in such a way that a beverage comparable to tea made manually is obtained. That is why many beverage dispensing machines make do with dispensing hot water, after which the user himself has to add a measured quantity of tea.

DE 2829775 discloses a method in which the water reservoir is filled with water and the filter is filled with tea leaves. The device is then switched on, and the water is heated. The water moves through a funnel onto the tea leaves, and on reaching a certain level of a siphon placed behind the reservoir the tea moves into the teapot.

DE 2829775 discloses a discharge system with an overflow, the outlet of which extends over a short vertical distance downwards.

It is the object of the present application to provide a method by means of which tea with an improved flavour can be prepared and problems of tea leaves adhering to the strainer can be prevented.

According to the present invention, the discharge line of the ready beverage is closed off in the first instance. This makes it possible to feed in a quantity of water to the container that is such that at the position of the strainer the water is slightly above said strainer. Tea leaves are then fed in. After that, further preparing of the beverage can proceed by adding further water, and the ready beverage is already being discharged. It has been found that if this method is followed, blockage of the strainer no longer occurs through the adherence of tea leaves. It is assumed that this is due to the fact that through the presence of a layer of water above the strainer, tea which comes into contact with the water above the strainer swells up. It is assumed that in the prior art tea likewise swells up in the perforations of the strainer through the presence of water, and in this way blocks the openings. These tea leaves are not easy to remove because they are stuck in the perforations of the strainer. The strainer is now prevented from becoming blocked by making the tea swell up already above the strainer. It should be understood that the validity of this patent is not dependent on the correctness of the above theory.

Through the use of some kind of discharge line or other, it is, furthermore, possible according to an advantageous embodiment of the invention to bring the water fed in into contact with the tea leaves for a longer period of time. This permits an operation which is similar to conventional making of tea. According to an advantageous variant of the present invention, after a first small quantity of water is provided up to above the strainer level and subsequent introduction of tea leaves, at the same time and/or thereafter a further quantity of water is introduced, followed by a brewing period. Such a period can last from a few seconds up to ten seconds and is, for example, approximately eight seconds. This means, surprisingly, that the formation of foam on the beverage in the discharge line is also prevented.

In order to keep the volume of the container as small as possible, according to an advantageous further development of the invention, provision is made for further water to be supplied to the container at the same time as the discharge line becomes operational or is opened. This water mixes with the already brewed beverage and also absorbs flavourings from the tea leaves.

Depending on the construction used, the brewed tea can be discharged immediately when further water is poured on, but it is preferable to do this a little later, such as after 3 seconds or, more particularly, after 6 seconds. With the method according to the invention, it is possible to operate without pressurization.

The discharge line can comprise any conceivable construction, such as an electrically opening and closing valve. It is also possible to fit valves that open and close mechanically and, according to an advantageous embodiment, a simple siphon is used. In this way the container will be emptied completely only when a predetermined level of the liquid in the container is exceeded.

According to a particularly advantageous embodiment of the invention, the container is in split form and is composed of a container casing and a strainer. This makes it possible to move the container casing away from the strainer in order to move a cleaning device such as a brush over the strainer. This means that residues of tea leaves that have collected on the strainer can be removed from the strainer into a waste bin.

The separation movement of the casing relative to the strainer and the movement of the cleaning device can be performed in any conceivable manner.

According to a particularly simple variant of the invention, a cam which is fitted so as to be rotatable is present. The casing is provided with a projection such as a wheel on which the cam engages and, through rotation of the cam, the casing can be moved up and down in order to clear a space above the strainer. A crank can be connected to the same cam, which crank by way of an arm moves the strainer cleaning device preferably according to a translation movement over the strainer surface.

It will be understood that with a suitable control system the process of making the tea or any other beverage can be adapted as desired. It is possible here for the user to make slight adaptations to the process.

For instance, during a first step a small quantity of water, such as 15-20 cc, can be fed into the container. This means that the strainer level is completely covered. When the tea leaves are being fed in, a further quantity of water, for example 40 cc, is fed in. After that, the making or brewing operation takes place, an operation that can take, for example, eight seconds. Further water is then fed in and, where a siphon is being used, the critical level for putting the siphon into operation is rapidly reached, and with further pouring in of water, for example a quantity of approximately 60 cc, a total of approximately 120 cc of beverage can be prepared.

It will be understood that other methods of preparing the beverage can be realised, depending on the beverage and the preferences of the user.

With the construction according to the present invention, there is no longer the problem of the strainer becoming blocked, thereby causing the next ready portion of beverage prepared to be too small in volume.

With the present invention it is possible to make a portion of tea within a relatively limited time of between 5 and 18 seconds, the flavour and appearance of which tea are similar to conventionally made tea. Such a preparation time does not constitute any problem, because a period of upwards of 20 seconds is usual for making coffee.

The present invention will be explained in greater detail below with reference to an exemplary embodiment illustrated in the drawings, in which.

Figure 1:
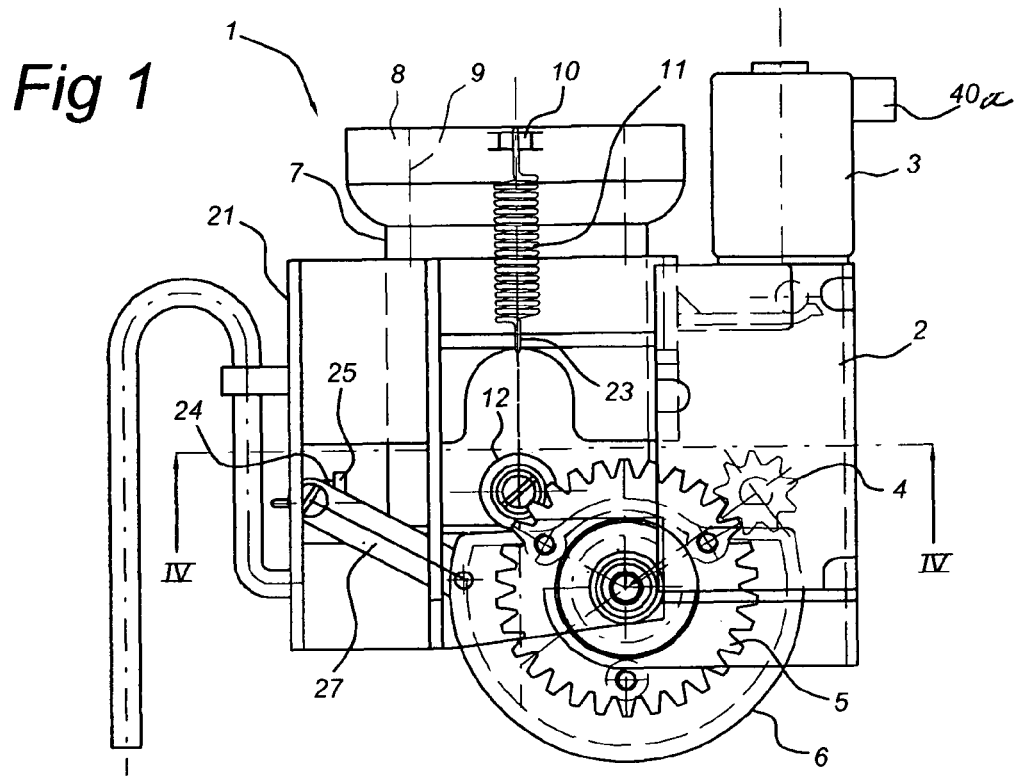
FIG. 1 shows diagrammatically in side view the beverage-preparing unit according to the invention.

The beverage-preparing unit according to the invention is indicated in its entirety by 1 in FIG. 1 and is intended in particular for preparing tea. It is suitable for fixing on a frame 2, which is situated in an immovable position in a beverage-preparing device. Motor 3 is fitted immovably on frame 2, and motor 3 is provided with an output gearwheel 4. Unit 1 can be detached from frame 2 and motor 3, for example for washing in a dishwasher. The unit is provided with lips 37 and a locking construction 38 for a secure grip with the frame 2 and easy removal from said frame.

The beverage-preparing unit 1 is composed of a housing 21 in which a cup casing 7 is movable up and down and a brush 25 is movable to and fro.

Figure 2:
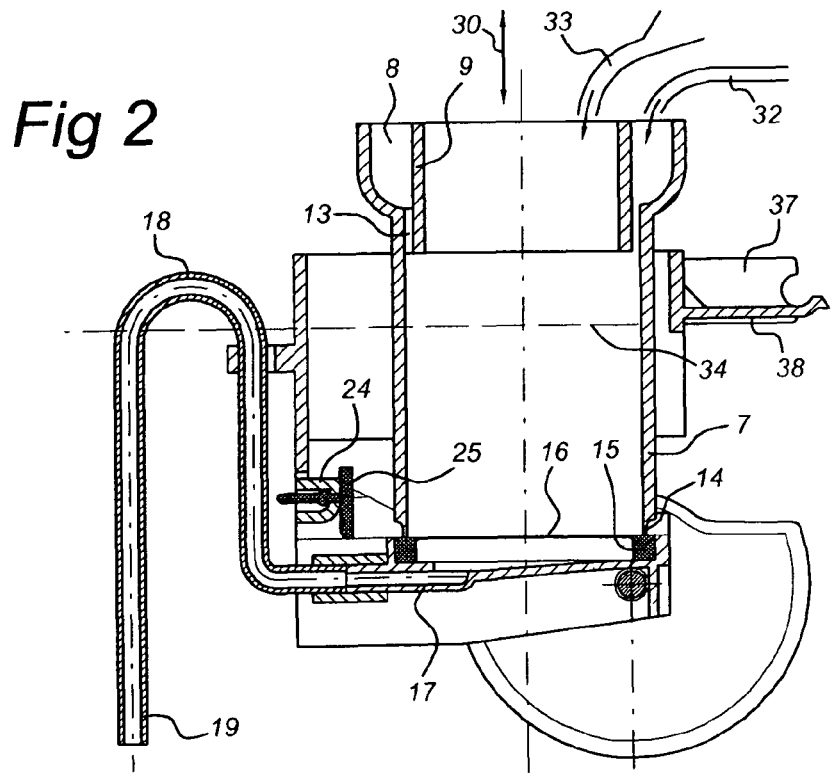
FIG. 2 shows by the same view the principle of the various parts according to the present invention.

As can be seen from FIGS. 1 and 2, the cup casing 7 is composed of an inlet part 8 which is bounded by the outside wall of sleeve 7 and partition 9. A gap 13 running all the way round is bounded below the inlet part. The lower edge of cup sleeve 7 can engage in a sealing manner with a sealing ring 15. Inside the sealing ring 15 a strainer 16 lying flush with or slightly above said ring is present, the mesh size of which strainer depends on the user's requirements (on average approximately 80 μm).

The strainer 16 and seal 15 are accommodated in a discharge part 17, the line of which is connected to a siphon 18, which ends in outlet 19.

As can be seen from the figures, the cup sleeve 7 near its bottom end is provided with a roller or wheel 12 on both sides. Furthermore, a spring 11 is present, which spring engages between a fastening 10 on the cup sleeve 7 and a fastening 23 on the housing 21. The cup sleeve 7 is provided with projecting ribs 20 situated opposite each other (FIG. 3), which ribs are accommodated in corresponding grooves 22 (FIG. 4) in the housing 21. With this construction, the cup sleeve 7 can be moved up and down in the direction of arrow 30 and is pre-tensioned in the downward direction by spring 11, so that the lower edge 14 of the cup sleeve 7 comes to rest in a sealing manner on the sealing ring 15.

A gearwheel 5 is fixed rotatably on the housing 21, which gearwheel meshes with gearwheel 4 when the unit 1 is fixed properly against the frame 2. A cam 6 is non-rotatably connected to this gearwheel 5, which cam can act upon wheel 12. As can be seen from FIG. 3, such a cam is present on both sides of the housing 21. Hingedly connected to the cam is an arm 27, which at its other free end acts hingedly upon a brush carrier 24. As can be seen from FIG. 2, the brush carrier is provided on its end with a brush 25, which is preferably composed of a readily deformable rubber elastic material. The brush 25 is embodied so that it can be moved over strainer 16. Carrier 24 is accommodated in a guide 26 in housing 21.

Reference numeral 32 is a diagrammatically illustrated water supply line, which is generally connected to the frame, while 33 is a feed line from a tea reservoir.

Figure 3:
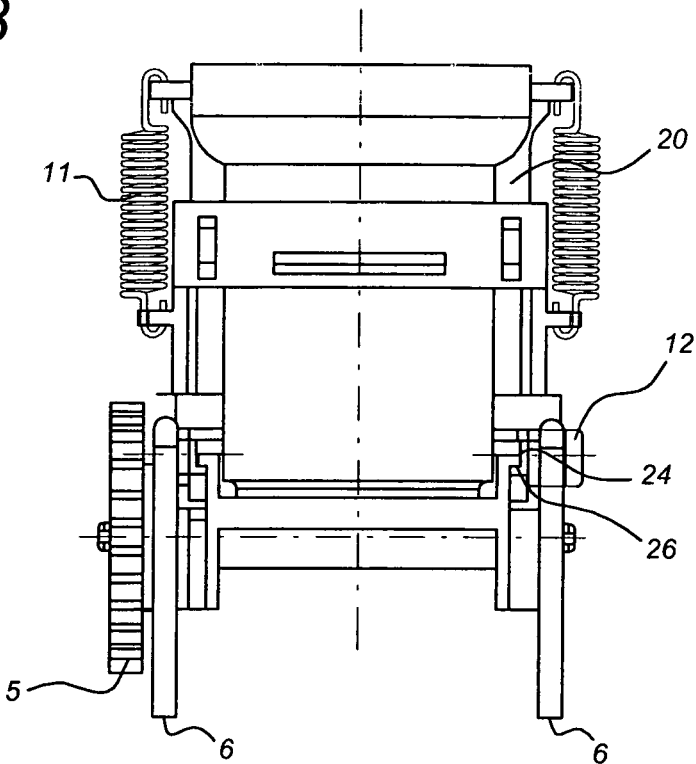
FIG. 3 shows a view of the beverage-preparing unit rotated through 90 degrees relative to FIG. 1.
Figure 4:
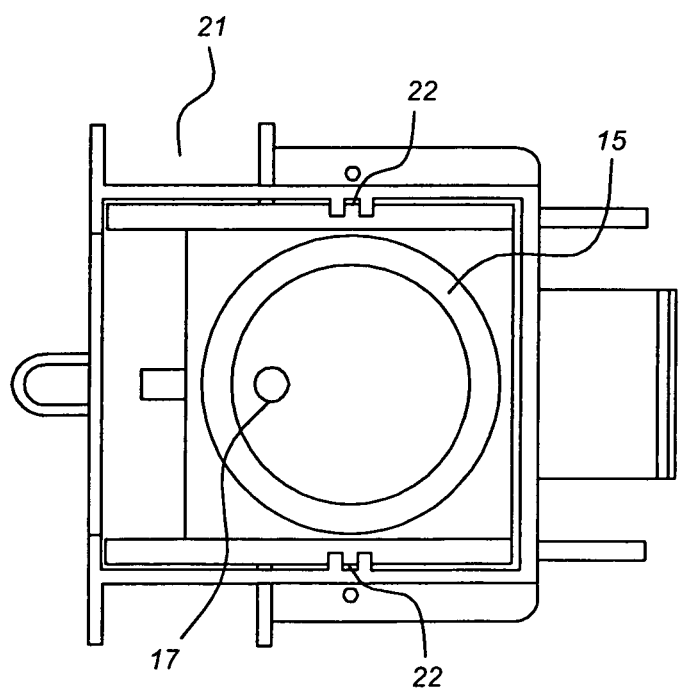
FIG. 4 shows the cross section along line IV-IV in FIG. 1.

The device described above functions as follows:

Starting from the position shown in FIGS. 1-3, a first relatively small quantity of water is introduced through line 32 into inlet part 8. Such a quantity is, for example, approximately 15-20 cc. This water moves from the inlet part 8 through the gap 13 along the wall of cup sleeve 7, and the selected quantity is such that at least a small quantity of water is ultimately present above strainer 16. A measured quantity of tea leaves is then fed in through line 33. On contact with the water already present, tea leaves will immediately absorb the water and swell before the tea leaves can reach the bottom of the strainer. Subsequently and/or at the same time a further quantity of water is fed in through the filling part 8. This quantity can be, for example, 40 cc of water. Owing to the fact that this water flows in the manner described above along the wall of the cup sleeve, it will cause an upward whirling movement on coming into contact with the sealing ring 15, with the result that the "drawing" of the tea is promoted. In this way the tea leaves introduced will also be moved away from strainer 16 as much as possible. After the introduction of this further quantity of water, the level in the cup sleeve has risen to level 34, in other words below the highest point of siphon 18. The tea leaves are then given some time, so that in combination with water the desired beverage is obtained. As an example, a waiting time of 5-10 seconds and more, in particular approximately 8 seconds, is applied. A further measured quantity of water is then fed in to the cup sleeve 7. This can be, for example, 60 cc in the example mentioned. After a relatively short time here, the upper level of siphon 18 is reached, and a flow of ready beverage is obtained through discharge line 17 and outlet 19. The water going in mixes immediately with the beverage already made. A control system 40A is present for supplying measured quantities of said tea leaves and water, and putting said discharge line into operation, characterized in that said control system is embodied in such a way that in the course of preparing tea during a first tea making step the discharge line from said container is blocked, and the discharge line from said container is not operational until a quantity of water is introduced into said container that is such that said strainer is substantially covered with water, followed by the introduction of tea leaves when the discharge line from said container is put into operation.

The cup sleeve 7 then empties completely through the lever action, and the tea leaves which are completely saturated with water are left behind on the strainer 16.

Figure 5:
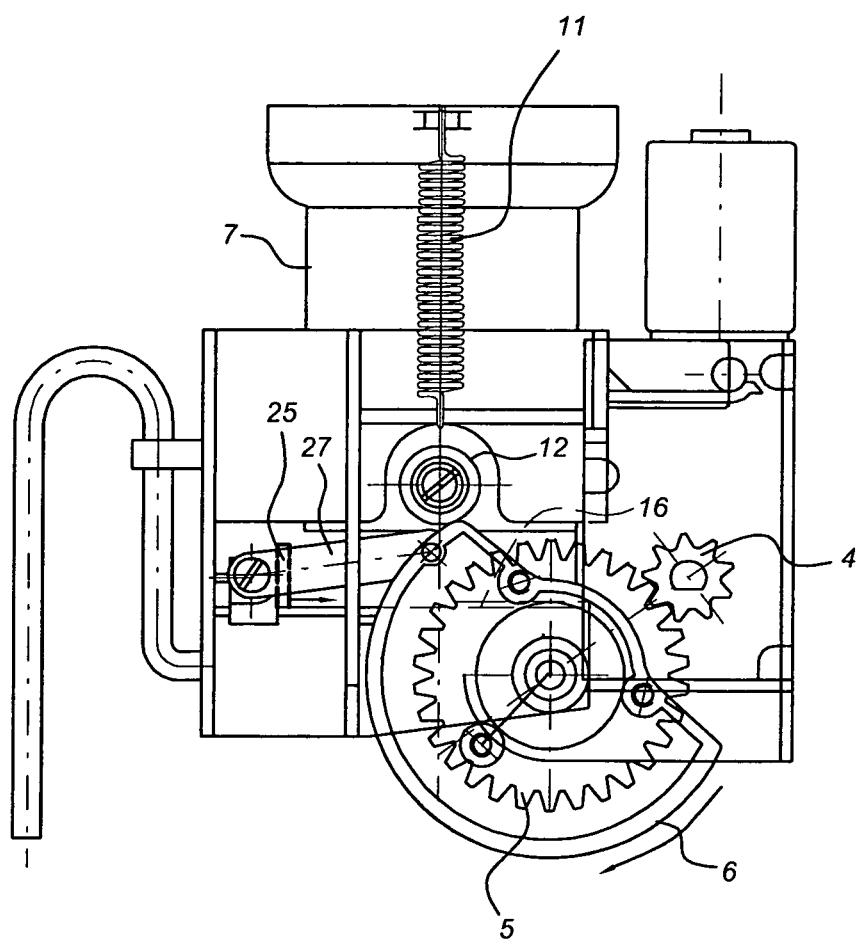
FIG. 5 shows the device according to FIG. 1 in a further operating position.
Figure 6:
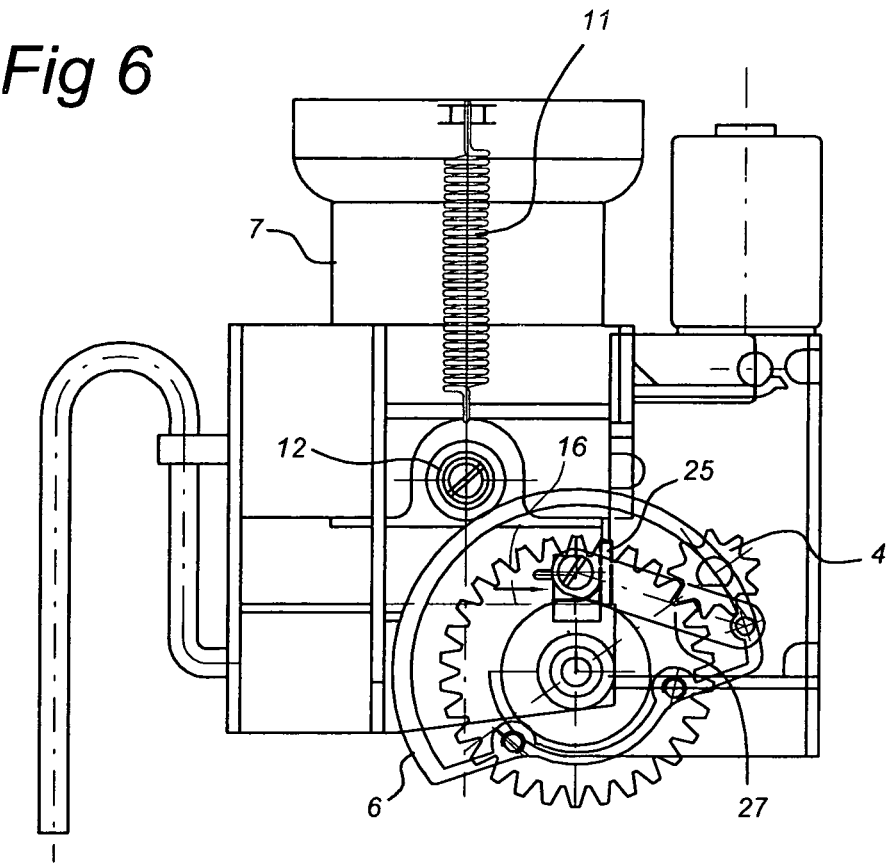
FIG. 6 shows the device in FIG. 5 in yet another operating position.

Motor 3 is then operated, with the result that, as shown in FIG. 2, gearwheel 5 turns clockwise. As a result of this, cam 6 goes into engagement with wheel 12, and the situation shown in FIG. 5 results. The cup sleeve 7 is raised to its highest point here by the cam 6 against the action of spring 11. The height over which the bottom edge 14 of the cup sleeve 7 is moved is such that the brush carrier 24 together with the brush 25 can move into the space below the bottom edge 14 of the cup sleeve 7. This movement is caused by the further rotation of the cam 6 from the position in FIG. 5. As a result of this, the wheel 12 will not be moved any further, but arm 27 will in fact (as shown in the drawings) be moved to the right to take the brush carrier 24 with brush 25 along with it so as to brush along strainer 16. The tea residues accumulated in front of the brush 25 are moved to the right and discharged into a waste bin situated below the unit. After this, gearwheel 5, and therefore cam 6, move back in the opposite direction, and the initial position is obtained, after which a new tea-preparing operation can be performed. It is preferable for sensor means (not shown) to be present, which sensor means detect the position of the cam 6 and gearwheel 5 respectively relative to the housing, so that motor 3 can be driven on that basis.

Figure 7:
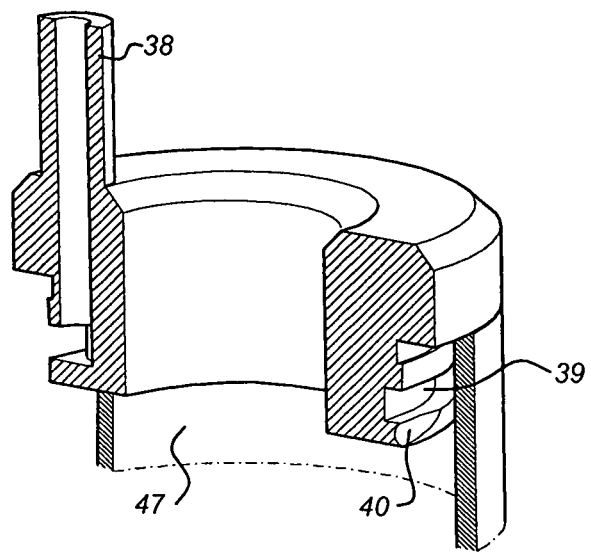
FIG. 7 shows a variant for the addition of the water.

FIG. 7 shows a variant of the upper part of the device. In this embodiment the water is introduced through an inlet pipe 38 which opens into an inlet channel 39, which is sealed relative to the wall 47 of the device. This sealing is not present at a number of channels 40 (for example three or four) which, are directed tangentially. As a result of this, a spiral-shaped flow of water along the wall of sleeve 47 will be generated when water is introduced.

The result is that the tea leaves will undergo a gradual rotating movement, and will not adhere to wall 47.

Both in this embodiment and in the embodiment described with reference to FIGS. 1-5, it is possible to feed in an additional quantity of water just before complete emptying of the sleeve 7, 47, by means of which water the wall is cleaned just before the cleaning operation of the remaining part of the device is carried out.

After reading the above description, the person skilled in the art will immediately understand that many variants of the invention are possible. Instead of tea leaves, it is possible to feed in any other powder which when combined with a liquid produces the desired beverage. Furthermore, it will be understood that the movement up and down of the cup sleeve can be obtained in one way or another. The same applies to the cleaning of the strainer and the discharge of beverage through the siphon. The latter can be replaced by a valve mechanism, or can be used in combination with it. These and further variants lie within the scope of the appended claims.

I claim:

1. A device for automatic preparing of tea, comprising a container, said container provided with a bottom, a strainer provided on said container bottom and further provided for holding a quantity of tea during a brewing cycle, a water supply connected to said container for initially delivering a quantity of water to the container, with a feed line provided for the delivery of a quantity of tea to said container for the brewing of tea, and said water supply thereafter delivering a further quantity of water to the container for providing for the brewing of a full measure of tea for consumption, a control system operatively connected to the water supply for selectively and electrically opening and closing valves to provide for the sequential delivery and shut-off of the supply of water and tea during the brewing cycle, a discharge line connecting with the container below said strainer, said discharge line incorporating a siphon, the highest point of which is situated below the highest water filling level of the water added into said container during the brewing cycle, a shiftable sleeve provided within said container, said sleeve being sealed with said container bottom during a brewing cycle, a motor driven cam operatively connected with said sleeve and capable of shifting said sleeve upwardly above the strainer and said container bottom to provide for a cleanout of the remaining tea after the brewing cycle, said cam coupled with a gear means, a motor connecting with said cam and gear wherein the actuation of said motor pivots said gear and cam, wherein said pivoting of said gear and cam provides for the lifting of said sleeve to provide clearance for cleanout of any remaining tea, a cleaning device connected with said cam, and said cleaning device provided for moving across the tea laden strainer to clean said strainer of residue tea after the brewing cycle.

2. The device of claim 1 including a crank arm connecting with said cam and with said cleaning device, said crank arm capable of pulling said cleaning device across said tea laden strainer to provide for cleanout of the tea after the brewing cycle.

3. The device of claim 2 wherein said cleaning device comprises a brush.

4. The device of claim 3, wherein said container comprises said container sleeve and said container bottom with said strainer, the container sleeve and strainer being movable away from each other in order to allow said cleaning device between them.

5. The device of claim 4, in which said cleaning device comprises said brush which is movable along the surface of said strainer.

6. The device of claim 5, comprising a motor-driven crank with said crank arm for moving said brush.

* * * * *